April 7, 1942.   G. MUSAPHIA   2,279,241
APPARATUS FOR MAKING ANIMATED MOTION PICTURES
Filed Sept. 21, 1938   2 Sheets-Sheet 2
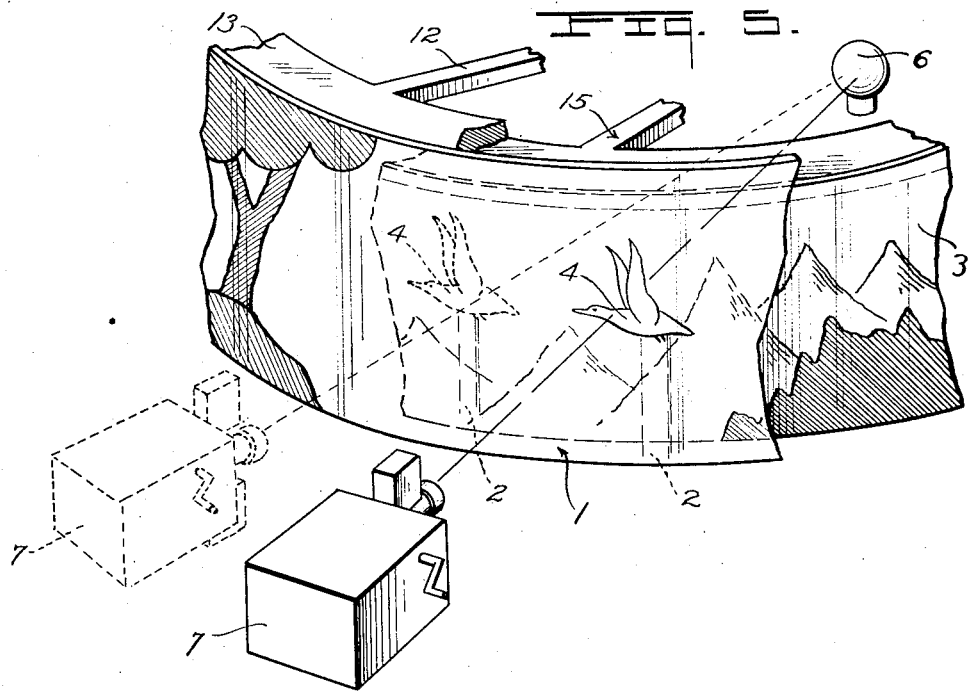
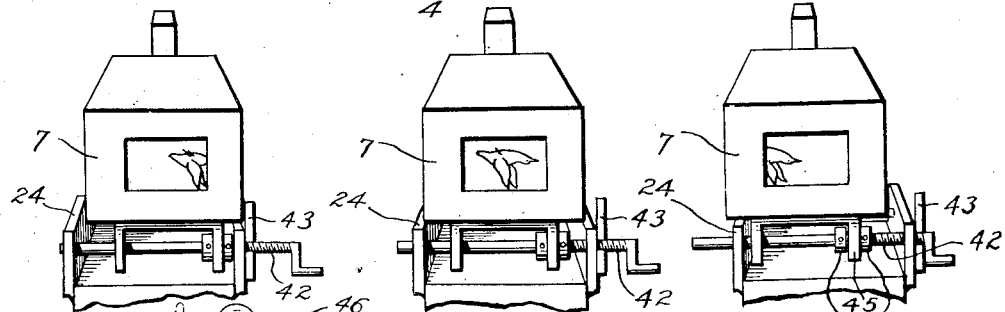
Inventor
GEORGES MUSAPHIA
by
Attorney Patented Apr. 7, 1942

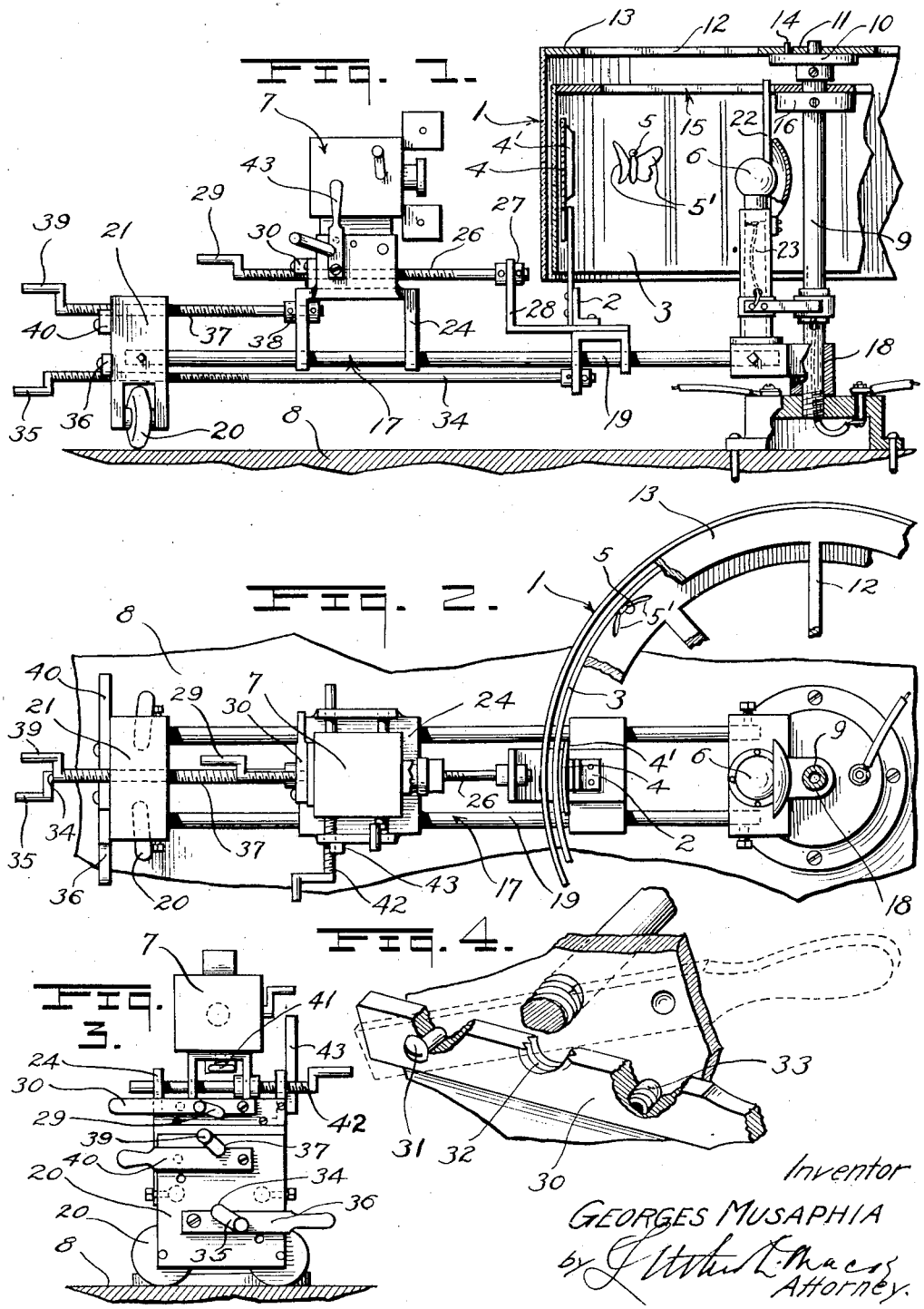

2,279,241

UNITED STATES PATENT OFFICE 2,279,241

APPARATUS FOR MAKING ANIMATED MOTION PICTURES

Georges Musaphia, Los Angeles, Calif.

Application September 21, 1938, Serial No. 231,029

8 Claims. (Cl. 88—16)

This invention relates to a new and useful apparatus for making motion pictures by creating an animated image of an inanimate figure and photographing said image.

An object of this invention is to provide for the making of "animated" motion pictures at an appreciable saving in time and costs, thru the instrumentality of a motion picture camera, a screen for revealing an animated image of an inanimate figure disposed behind the screen, a light behind the figure, a means for effecting relative movement of the camera, the figure, and the light whereby to produce an animated image on the screen, a means of operative connection between the camera, the figure, and screen for maintaining the camera and screen in predetermined positions, and adjusting means operable for varying the positions of the camera and figure with respect to one another and the screen for varying and regulating the animated effects.

Another object of the invention is to provide apparatus of the character described wherein the camera and display figure are respectively on opposite sides of the screen which is to display the image of the figure and are connected for simultaneous bodily movement or for movement relative to one another whereby various animated effects may be produced.

Another object of the invention is to provide apparatus of the character described wherein a rotary carrier may be provided for moving a figure between the camera and source of light with the screen interposed between the carrier and the camera and wherein provision is made for moving the camera in a circular path around the screen while maintaining the proper focus for photographing images displayed on the latter, all for the purpose of creating a variety of animated effects with the apparatus hereof.

I have shown in the accompanying drawings a preferred form of my invention, subject, however, to modification, within the scope of the appended claims, without departing from the spirit of my invention.

Referring to the drawings:

Fig. 1 represents a fragmentary side elevation with parts shown in section, of apparatus constructed in accordance with this invention.

Fig. 2 represents a fragmentary top plan view of the apparatus shown in Fig. 1.

Fig. 3 represents an enlarged rear elevation of the camera and associated units as shown in Figs. 1 and 2.

Fig. 4 represents an enlarged fragmentary perspective view of one of the clutches.

Fig. 5 represents an enlarged fragmentary, schematic perspective view illustrative of the principles of operation and animated effects.

Figs. 6, 7, and 8 are schematic perspective views illustrative of the manner in which certain animated effects, such as the passing of a figure across the film, are obtained.

Fig. 9 is a side elevation of a modified form of support for the figure to be animated, showing means for raising and lowering said figure.

Fig. 10 is a side elevation of another modified form of figure and supporting means wherein the figure is pivoted on the supporting means.

The method of using the apparatus of this invention consists in creating upon a screen an animated image of an inanimate figure or object by means of directing light rays onto the figure and screen and either moving a motion picture camera with respect to the image on the screen while photographing the latter, or moving the screen, or moving the figure, or various combinations of all or any such movements. One way of carrying out this method takes into consideration the mounting of a motion picture camera and a figure, the image of which is to be photographed, so that when a screen is interposed at the proper position between the figure and the camera, and light rays from a suitable source are directed from behind the figure and screen so as to produce on the latter an image of the figure, the screen image will be animated upon movement of the figure and camera with respect to the screen and the light. Variations of this method may include moving of the camera and figure as one toward and away from the screen or transversely thereof or may take into account the moving of the figure toward and away from the screen into and out of focus or likewise moving the camera into and out of focus. Preferably, the figure is translucent and may or may not be colored or treated with fluorescent material so as to fluoresce under excitation of light rays of proper wave length. It may also have portions offset from the plane of the remainder to enhance the animation effect. At any rate, the use of a translucent or light penetrable figure between a source of light and a light penetrable or translucent screen will bring about the projection of the image of the figure on the screen without shadow effects, and as long as relative movement takes place between the figure and light or the figure and camera various animated effects may be created and thereby continuously photographed. For example, the screen might be equipped with scenic effects, such as mountains or trees, and the figure may simulate a bird so that relative movement of the figure and screen or movement of the camera and figure relative to the screen will produce unique and realistic animated effects. Moreover, the movement of the figure transversely of the camera will give the effect of a bird flying. Again, the figure could be moved up and down to give corresponding animation effects to the image or, the camera can be moved to create similar effect.

One form of apparatus as under this invention is shown in detail in the accompanying drawings and generally comprises a cylindrical, rotary, translucent or otherwise light penetrable screen 1 mounted for rotation about a vertical axis, carriers 2 and 3 for supporting figures 4 and 5 between the screen and a source of light 6 whereby images of the figures will be displayed upon the screen, a motion picture camera 7 arranged to photograph the images appearing on the screen, and various means, which will be hereinafter described, for effecting and coordinating the movements and operations of the aforementioned elements and parts. The figures 4 and 5 may have offset portions 4' and 5' to enhance the animated effect.

As here shown, a suitable base 8 supports a standard 9 having a disk 10 fixed to its upper end. This disk engages a hub portion 11 from which spokes 12 extend to an annular member 13 to which the screen 1 is fixed. Altho the screen may be mounted to rotate relative to this standard it is preferably stationarily held, as by means of the pin 14.

The carrier 3 is cylindrical and arranged within the confines of the screen 1 and is rotatably supported upon the standard 9 by means of the structure 15 corresponding to the hub 11, spokes 12, and annular member 13, there being a disk 16 fixed on said standard for rotatably supporting the structure 15. The carrier is made of translucent or other light penetrable material and has the figure 5 fixed to the inner side thereof whereby when the carrier moves the figure will likewise move and an animated image thereof will be displayed upon the screen 1. The carrier may be motor driven or, as shown, arranged for manual manipulation, and no matter how moved will produce an animated image of the figure or figures supported thereon.

The carrier 2 for the figure 4, the camera 7, and the source of light 6, are mounted upon a carriage 17 which is rotatably secured as at 18 to the standard 9. This carriage is so constructed that the light source will be disposed toward the center of the structure, that is, adjacent the standard 9, the figure 4 will be disposed adjacent the inner face of the carrier 3 and screen 1, and the camera 7 disposed in outwardly spaced relation to said screen in position to photograph the images appearing thereon. Consequently, the carriage is in the form of an arm 19, the inner end of which is secured to the standard as above noted, while the outer end is supported by a caster 20 mounted in a block 21. This provides for moving of the camera, figure 4, and light 6 in circular paths with the camera and figure on opposite sides of the screen while maintaining said camera and figure in predetermined spaced relation to one another whereby the camera will at all times be in focus with the image on the screen.

One means of moving the carrier 3 so that movement of the figure 5 thereon will correspond to movement of the figure 4 on the carrier 2, includes an extension 22 on the support 23 for the light source 6, said extension being adapted to engage the structure 15 so that as the light source 6 travels in its orbit around the standard 9 the carrier 3 will be rotated.

The carrier 2 is longitudinally adjustably supported upon the arm 19 so that the figure 4 may be moved toward and away from the screen between the latter and the light source to create variational animated effects, whereas the camera 7 is mounted upon a support 24 longitudinally adjustably supported upon said arm 19 whereby the camera may be moved toward and away from the screen for varying the photographic effects. Provision is also made for moving the figure 4 and the camera in unison while in predetermined spaced relation to one another whereby the figure may be moved toward and away from the screen while also moving the camera in the same manner with respect to the screen.

As here shown, an adjusting screw 26 has one end rotatably secured as at 27 to an extension 28 of the carrier 2, and is slidably supported on the camera support 24. The other end of this screw is provided with a crank 29. A clutch bar 30 is pivoted as at 31 upon the support 24 and is provided with a screw threaded recess 32 adapted to cooperate with the screw threads of the screw 26 when said arm is swung into a predetermined position in which the detent 33 will hold said arm in engagement with the screw. When thus engaged with the screw the clutch arm effects a lock so that if the carriage 2 is moved the support 24 will likewise be moved, and vice versa. However, if the crank 29 is rotated while the clutch bar is in operative position and the support 24 is not otherwise held while the carriage 2 is held against movement, then the support 24 will be moved in or out with respect to the screen, depending upon the direction of rotation of the screw.

A similar adjusting screw 34 is rotatably fixed to the carrier 2 and slidable freely in the block 21, there being a crank arm 35 on its outer end. Operating in conjunction with this screw is a clutch bar 36 corresponding to the one 30. When this bar is in operative contact with the screw 34 and the latter is turned, and assuming the screw 26 is then freely slidable in the support 24, the carriage 2 may be moved so as to move figure 4 toward and away from the screen relative to the camera provided the latter is stationarily held by the means which will be later described. However, if the camera support 24 is locked to the screw 26 by means of the clutch bar 30, and the support is free to move bodily, then rotation of the screw 34 tending to move the carriage 2 will likewise move the camera support and camera thereon. To provide for holding the camera against movement on the arm 19 and also afford a means for adjusting the camera, a screw 37 is rotatably fixed as at 38 to the camera support 24 and is slidably supported in the block 21, there being a crank 39 on the outer end of said screw. Cooperating with this screw is a clutch bar 40 pivoted on the block 21 and corresponding to the clutch bar 36. When the clutch bar 40 is engaged with the screw 37 the camera support is held against sliding movement on the arm 19. Consequently, if the clutch bar 30 is out of contact with the screw 26 and the latter is free to move relative to said support, while the support 24 is held by the screw 37 and clutch bar 40, then the carrier 2 is free to move relative to the camera upon operation of the screw 26, as aforesaid.

Other adjustments may be provided thru various manipulations of the several screws and clutch bars. The camera may also be vertically adjusted on its support thru manipulation of the means indicated at 41 in Fig. 3. Moreover, the camera is adapted to be moved transversely back and forth by means of a screw 42 and an associated clutch bar 43 pivoted on the support 24.

The camera 7 is affixed to the screw 42 by means of collars 44 and bracket 45. The clutch bar 43 is arranged to cooperate with the screw in the same manner as the other clutch bars. With this arrangement, when the clutch bar 43 is in inoperative position the operator may move the camera freely back and forth, the screw sliding bodily at this time. However, when the clutch bar 43 is in operative position and the screw is turned the camera may be moved uniformly by the action of the screw.

As shown in Fig. 9, a modified form of the invention includes the mounting of a figure 46 upon a support 47 pivoted as at 48 to a carrier 49 which will correspond to the carrier 2. It will be noted that the support 47 is made of transparent material so that no image thereof will be thrown on the screen, and this is likewise true of that part of the support 2 which extends upwardly behind the screen. Upon tilting the support 47 the figure may be moved upwardly and downwardly in an arc. This form of support will be mounted upon the carriage 17 and associated with the adjusting screws in the same manner as the carrier 2.

In Fig. 10 is shown another form of carrier wherein the object 50 is pivoted as at 51 upon the carrier support 52, which corresponds to the one 47. This support 52 is adapted to be pivotally supported in the same manner as the one 47 and is also made of transparent material. The figure will always maintain a horizontal position due to the manner in which it is pivoted.

I claim:

1. Apparatus for making motion pictures comprising a screen, a camera adapted to be focused upon one side of the screen, a figure disposed adjacent the other side of the screen, a source of light arranged to direct rays onto said figure and screen, means for effecting relative movement of the figure and light for creating on the screen an animated image of said figure in focus with said camera, and means of connection between the camera and figure providing for simultaneous movement thereof relative to said screen.

2. Apparatus for making motion pictures comprising a screen, a camera adapted to be focused upon one side of the screen, a figure disposed adjacent the other side of the screen and having a portion disposed out of the plane of the remainder thereof, a source of light arranged to direct rays onto said figure and screen, a common means for effecting corresponding movement of the figure, camera and light relative to the screen for creating on the screen an animated image of said figure in focus with said camera, and means providing for other movement of the camera relative to the screen.

3. Apparatus for making motion pictures comprising a screen, a camera adapted to be focused upon one side of the screen, a figure having an offset portion and disposed adjacent the other side of the screen, a source of light arranged to direct rays onto said figure and screen, and a common means for effecting corresponding movement of the figure and light relative to the screen for creating on the screen an animated image of said figure in focus with said camera, and means for moving the figure toward and away from said screen.

4. Apparatus for making motion pictures comprising a screen, a camera adapted to be focused upon one side of the screen, a figure disposed adjacent the other side of the screen and having at least a portion disposed out of the plane of the remainder thereof, a source of light arranged to direct rays onto said figure and screen, a common means for effecting corresponding movement of the figure and light relative to the screen for creating on the screen an animated image of said figure in focus with said camera, and means mounted on said common means for moving said camera and figure simultaneously toward and away from said screen.

5. Apparatus for making motion pictures comprising a screen, a camera adapted to be focused upon one side of the screen, a figure disposed adjacent the other side of the screen and having at least a portion disposed in a plane other than the remainder thereof, a source of light arranged to direct rays onto said figure and screen, a common means for effecting corresponding movement of the figure and light relative to the screen for creating on the screen an animated image of said figure in focus with said camera, and means slidable on said common means and operable for effecting movement of the camera, and figure with respect to the screen.

6. Apparatus for making motion pictures comprising a cylindrical screen, a figure disposed adjacent the inner side of said screen, a source of light within the screen for directing light rays onto said figure and the portion of the screen adjacent said figure, a camera adapted to be focused upon the outer side of said screen, and means supporting said camera, figure, and source of light for simultaneous circuitous movement with respect to the screen for creating on the latter an animated image of the figure in focus with said camera.

7. Apparatus for making motion pictures comprising a cylindrical screen, a figure disposed adjacent the inner side of said screen, a source of light within the screen for directing light rays onto said figure and the portion of the screen adjacent said figure, a camera adapted to be focused upon the outer side of said screen, means supporting said camera, figure, and source of light for simultaneous circuitous movement with respect to the screen for creating on the latter an animated image of the figure in focus with said camera.

8. Apparatus for making motion pictures comprising a cylindrical screen, a figure disposed adjacent the inner side of said screen, a source of light within the screen for directing light rays onto said figure and the portion of the screen adjacent said figure, a camera adapted to be focused upon the outer side of said screen, and means supporting said camera, figure, and source of light for simultaneous circuitous movement with respect to the screen for creating on the latter an animated image of the figure in focus with said camera, and means operable during such movement of said camera, figure and light for moving either the camera or the figure toward or away from said screen.

GEORGES MUSAPHIA.